UNITED STATES PATENT OFFICE.

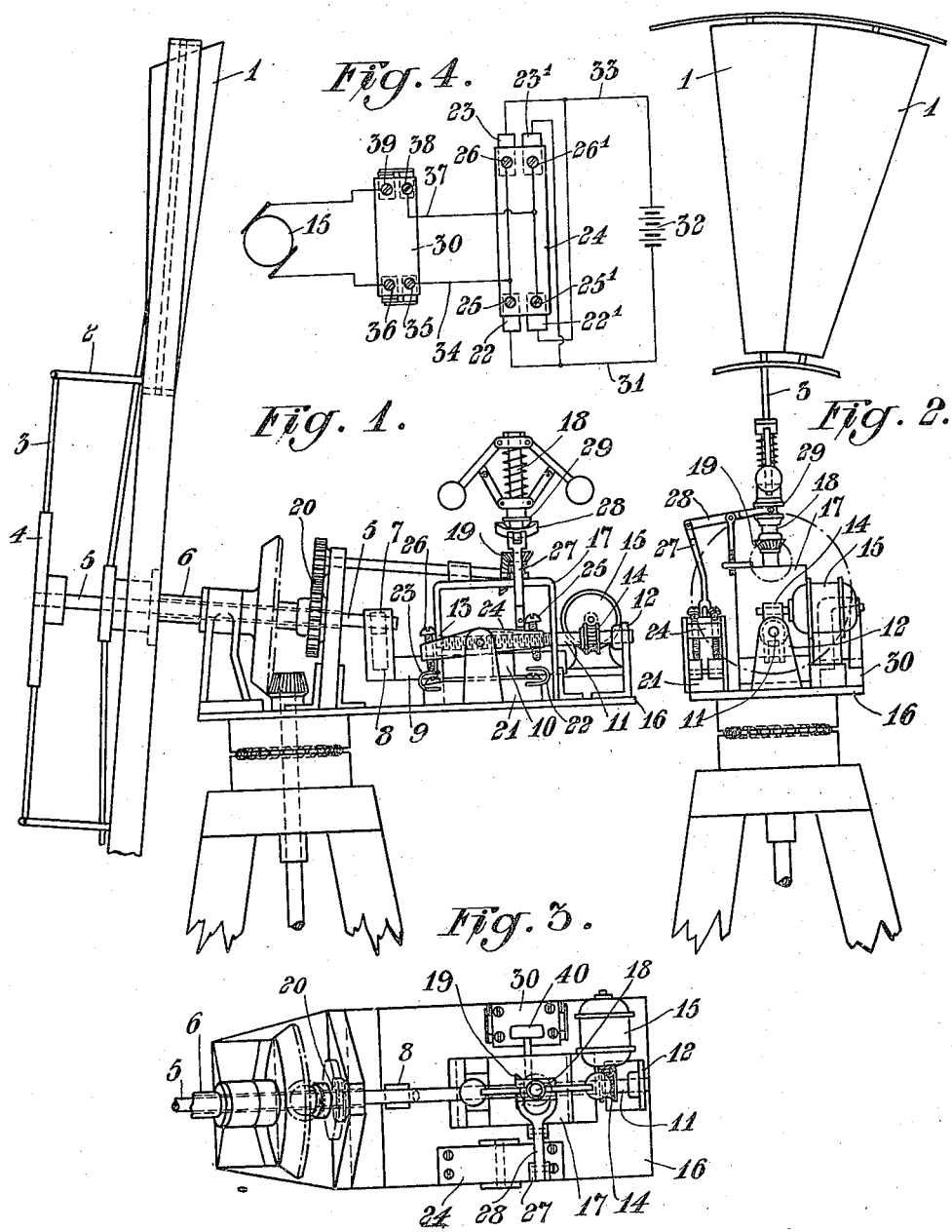

VICTOR JUNIUS JOHANSSON, OF LIDKÖPING, SWEDEN.

REGULATING DEVICE FOR WIND-MOTORS.

1,242,196. Specification of Letters Patent. Patented Oct. 9, 1917.

Application filed November 18, 1916. Serial No. 132,045.

*To all whom it may concern:*

Be it known that I, VICTOR JUNIUS JOHANSSON, a subject of the King of Sweden, residing at Lidköping, in the Kingdom of Sweden, have invented a new and useful Improvement in Regulating Devices for Wind-Motors, of which the following is a specification.

This invention relates to an improvement in wind motors of the kind which are provided with an electric servomotor for adjustment, so-called unfurling and reefing, of the sails of the wind-wheel, said motor being reversible and regulated by a governor driven by the wind motor, by means of a pole-changer or the like actuated by this governor in such manner that at normal speed of the wind motor and thus also of the governor, the pole-changer is held by the governor in such intermediate position that the motor circuit through the same is broken, while at increasing or decreasing speed of the wind motor the pole-changer is operated by the governor in such manner that a circuit becomes closed through the servomotor in one direction or the other.

The present invention is broadly characterized by this, that all apparatus, the servomotor, the governor, the pole-changer, the connections from the servomotor to the rotatable wings, are mounted on a common base-plate which is pivoted to the top of the wind motor mast and which supports bearings for the shaft of the wind-wheel and also this shaft and this wheel and the means for adjustment of the wind-wheel at right angles to the wind. It being very essential for a rapid and accurate operation of the regulating device that the parts actuated by the governor possess as little inertia as possible, the pole-changer suitably consists of an arm pivoted approximately at its middle point and provided at both ends with contacts coöperating with fixed contacts on the base-plate.

The device is further described here below, reference being had to the accompanying drawing which shows an embodiment of the invention by way of example. Figure 1 shows a side view of the regulating device and a portion of the wind-wheel, and Fig. 2 shows a rear view of the same. Fig. 3 shows a plan view of the device, and Fig. 4 is a diagram of the electrical connections between the pole-changer operated by the governor, and the electric motor.

The vanes or wind-sails 1 of the wind-wheel are rotatable in well known manner, and each one of the same is movably connected to a bar 2 (Fig. 1) pivotally connected to another bar 3 extending radially from a disk 4 on a shaft 5 sliding in the tubular shaft 6. The inner end of the shaft 5 is journaled in a bearing 7 sliding in vertical direction in a guide 8 rigidly connected to a slide-bar 9. A part 10 projecting upward from the slide-bar offers a nut for a screw 11 journaled at 12 and 13. This screw is driven by the electric servomotor 15 by means of a worm gearing 14. The servomotor is preferably mounted on the rear end of the base-plate 16. The spindle 18 of a ball governor is journaled in a yoke 17 secured to the said base-plate. The ball governor receives motion from the shaft 6 through the gearings 19 and 20. The contact member 21 is mounted on the base-plate 16 and is provided with four contacts 22, 22' and 23, 23' (Fig. 4). The pole-changer bar 24 is journaled above the fixed contact member 21, and is provided with four contacts 25, 25' and 26, 26' (Fig. 4) corresponding to the contacts 22, 22' and 23, 23'. The movable bar 24 is connected by means of the link 27 and the lever 28 with the governor sleeve 29. A circuit-breaker 30, the purpose of which is to be further explained here below, is mounted on the base-plate 16. The contacts 22 and 23' are connected by means of a connection 31, to one pole of a source 32 of current, and the contacts 22' and 23 through a connection 33 to the other pole of the source of current. The contacts 25 and 26 are connected to each other and through a connection 34 with the contact 35 of the contact pair 35, 36 of the circuit-breaker 30, the other contact 36 of which pair is connected with one terminal of the servomotor 15. The contacts 25' and 26' are connected to each other and through a connection 37 with one contact 38 of the other contact pair 38, 39 of the circuit-breaker 30, the other contact 39 of said pair being connected with the other terminal of the servomotor. An arm 40 (Fig. 3) projecting between the contact pairs 35, 36 and 38, 39 of the circuit breaker 30, is secured to the slide-bar 9, and when this slide-bar moves in one direction or the other the said arm 40 separates the contacts 35 and 36, or the contacts 38 and 39, in either case breaking the circuit to the servomotor.

The device operates in the following manner: At normal speed of the wind-wheel the movable bar 24 is held practically balanced by the governor, and the contacts 25, 25', 26, 26' are then separated from the contacts 22, 22', 23, 23'. At increased speed of the wind-motor the governor deviates and moves the contacts 25, 25' against the contacts 22, 22'. With the circuit to the servomotor 15 thus closed, the current flows from the source 32 of current through the connection 31, the contact 22, the contact 25, the connection 34, the circuit-breaker contacts 35 and 36, the servomotor 15, the circuit-breaker contacts 39 and 38, the connection 37, the contact 25', the contact 22', the connection 33, back to the source 32 of current. The servomotor is then caused to rotate so that it turns the screw 11 to the right in Fig. 2, and the slide-bar 9 and the shaft 5 connected with the same thus slide rearward, when the sails 1 become adjusted in such manner that the angle between the same and the wind becomes decreased, that is to say, the wind motor is reefed and its speed decreases, until normal speed is attained. The bar 24 will then again become balanced, and breaks the circuit to the servomotor which stops. On the other hand, if the speed of the wind motor becomes decreased, the corresponding deviation of the governor will cause a circuit to become closed through the contacts 26, 26', and 23, 23', and the current to the servo-motor 15 then passes from the source of current, through the connection 31, the contact 23', the contact 26', the connection 37, the circuit-breaker contacts 38 and 39, the servomotor 15, the circuit-breaker contacts 36 and 35, the connection 34, the contact 26, the contact 23, the connection 33, back to the source 32 of current. The electric motor 15 will then rotate in the opposite direction to that of the reefing and will thus cause, in a manner easily understood from the above description, the unfurling of the sails 1, that is to say, the angle between the same and the wind becomes increased and the wind-wheel will then immediately increase its speed, or return to normal speed. If when reefing, the force of the wind would decrease to such extent that the wind motor stops, or is ready to stop, the arm 40 will be moved so as to separate the circuit-breaker contacts 38 and 39 so that the circuit of the servomotor becomes broken and the motor stops. Otherwise the servomotor would continue to run, thus incurring the risk of the device becoming broken. At or before the limit of reefing, the circuit of the servomotor is also broken in the same manner by the circuit-breaker contacts 35 and 36 becoming separated.

It will be understood that the wind motor is provided with some suitable device, preferably a common wind rudder, for holding the wind-wheel in a certain plane relatively to the wind. It is also obvious that the device above described and illustrated in the drawing may be altered considerably as regards the details of the construction, without departing from the principle of invention stated above.

I claim:

1. In a regulating device for wind motors, the combination of a wind-wheel, rotatable sails in said wind-wheel, an electric reversible servomotor, means for transmitting motion from the said servomotor to the sails so as to turn the same in one direction or the other according to the direction of rotation of the servomotor, a governor driven by the wind motor, a pole-changer connected in the circuit of the servomotor and actuated by the governor in such manner that at normal speed of the wind motor the pole-changer occupies such intermediate position that the motor circuit is broken while at increasing and decreasing speeds of the wind motor the pole-changer is operated by the governor so as to close the circuit of the servomotor in one direction or the other, and a base-plate pivoted to the top of the wind motor mast and supporting the said wind-wheel, servomotor, governor, pole-changer and means for transmitting motion, substantially as and for the purpose set forth.

2. In a regulating device for wind motors, the combination of a wind-wheel, rotatable sails in said wind-wheel, an electric reversible servomotor, means for transmitting motion from the said servomotor to the sails so as to turn the same in one direction or the other according to the direction of rotation of the servomotor, a governor driven by the wind motor, a pole-changer connected in the circuit of the servomotor and actuated by the governor in such manner that at normal speed of the wind motor the pole-changer occupies such intermediate position that the motor circuit is broken while at increasing and decreasing speeds of the wind motor the pole-changer is operated by the governor so as to close the circuit of the servomotor in one direction or the other, said pole-changer consisting of an arm pivoted approximately at its middle point and provided with contacts at both ends, a connection between the said arm and the governor, a base-plate pivoted to the top of the wind motor mast and supporting the said wind-wheel, servomotor, governor, pole-changer and means for transmitting motion, and fixed contacts in said base plate coöperating with the contacts on said arm, substantially as and for the purpose set forth.

VICTOR JUNIUS JOHANSSON.